United States Patent
Collin

(10) Patent No.: US 10,247,515 B2
(45) Date of Patent: Apr. 2, 2019

(54) HOLOGRAPHIC SIGHT WITH OPTIMIZED REFLECTION AND IMAGE ANGLES

(71) Applicant: Ziel Optics, Inc., Ann Arbor, MI (US)

(72) Inventor: Fred Collin, Ann Arbor, MI (US)

(73) Assignee: Ziel Optics, Inc., Ann Arbor, MI (US)

( * ) Notice: Subject to any disclaimer, the term of this patent is extended or adjusted under 35 U.S.C. 154(b) by 369 days.

(21) Appl. No.: 15/193,567

(22) Filed: Jun. 27, 2016

(65) Prior Publication Data

US 2016/0377377 A1    Dec. 29, 2016

Related U.S. Application Data

(60) Provisional application No. 62/336,792, filed on May 16, 2016, provisional application No. 62/279,164, (Continued)

(51) Int. Cl.
*G03H 1/22* (2006.01)
*F41G 1/30* (2006.01)
(Continued)

(52) U.S. Cl.
CPC .............. *F41G 1/30* (2013.01); *G02B 5/32* (2013.01); *G02B 23/10* (2013.01);
(Continued)

(58) Field of Classification Search
CPC .............. G02B 5/32; G02B 2027/0181; G02B 2027/0183; G02B 27/0103; G02B 2027/0105; G02B 2027/0107; G02B 2027/0109; G02B 2027/0112; G02B 2027/0114; G02B 2027/0116; G02B 2027/0125; G02B 2027/0127;
(Continued)

(56) References Cited

U.S. PATENT DOCUMENTS 5,020,892 A    6/1991    Glover et al.
5,151,800 A    9/1992    Upatnieks
(Continued)

FOREIGN PATENT DOCUMENTS

EP    1154284 A1    11/2001
GB    2149141 A    6/1985
(Continued)

OTHER PUBLICATIONS

Chhajed, S. et al., "Junction temperature in light-emitting diodes assessed by different methods," Proc. SPIE 5739, Light-Emitting Diodes: Research, Manufacturing, and Applications IX, 16 (Mar. 25, 2005); doi:10.1117/12.593696.
(Continued)

*Primary Examiner* — Jennifer D. Carruth
(74) *Attorney, Agent, or Firm* — Dinsmore & Shohl LLP

(57) ABSTRACT

A holographic gun sight has a housing with a viewing end and an opposing target end, a viewing path being defined from the viewing end to the target end. A light source projects a light beam along a path to illuminate a reflection-type holographic optical element (HOE). The HOE reconstructs an object beam with an image of a reticle. The absolute difference between the incidence angle of the light beam on the HOE and the object beam angle is greater than zero and less than or equal to 30 degrees.

22 Claims, 16 Drawing Sheets

Related U.S. Application Data filed on Jan. 15, 2016, provisional application No. 62/184,927, filed on Jun. 26, 2015.

(51) Int. Cl.
*G02B 5/32* (2006.01)
*G02B 23/10* (2006.01)
*G02B 27/42* (2006.01)
*G02B 27/10* (2006.01)

(52) U.S. Cl.
CPC ....... *G02B 27/1086* (2013.01); *G02B 27/425* (2013.01); *G03H 1/22* (2013.01); *G03H 2001/2231* (2013.01); *G03H 2001/2284* (2013.01)

(58) Field of Classification Search
CPC ...... G02B 2027/013; G02B 2027/0134; G02B 2027/0136; G02B 2027/0174; G02B 27/0189; G02B 2027/015; G02B 23/00; G06K 9/76; G03H 2001/043; G03H 2240/25; G03H 2270/21; G03H 2222/20; G03H 2222/33; G03H 2222/40
See application file for complete search history.

(56) References Cited

U.S. PATENT DOCUMENTS

| | | |
|---|---|---|
| 5,483,362 A | 1/1996 | Tai et al. |
| 5,497,170 A | 3/1996 | Kato et al. |
| 5,508,843 A | 4/1996 | Tomita |
| 5,706,600 A | 1/1998 | Toole et al. |
| 5,754,574 A | 5/1998 | Lofthouse-Zeis et al. |
| 5,784,182 A | 7/1998 | Francoeur et al. |
| 5,815,936 A | 10/1998 | Sieczka et al. |
| 6,101,200 A | 8/2000 | Burbidge et al. |
| 6,490,060 B1 | 12/2002 | Tai et al. |
| 6,654,152 B2 | 11/2003 | Jacobowitz et al. |
| 6,738,187 B2 | 5/2004 | DeCusatis et al. |
| 6,751,014 B2 | 6/2004 | DeCusatis et al. |
| 6,947,458 B2 | 9/2005 | Moriarty et al. |
| 6,965,626 B2 | 11/2005 | Tatum et al. |
| 7,145,703 B2 | 12/2006 | Sieczka et al. |
| 7,190,904 B2 | 3/2007 | DeCusatis et al. |
| 7,257,920 B1 | 8/2007 | Shaffer et al. |
| 7,356,057 B2 | 4/2008 | Deng et al. |
| 7,428,254 B2 | 9/2008 | Seeds et al. |
| 7,542,189 B2 | 6/2009 | Tanimura et al. |
| 7,721,481 B2 | 5/2010 | Houde-Walter |
| 8,208,507 B2 | 6/2012 | Lerner et al. |
| 8,233,209 B2 | 7/2012 | Miyatake et al. |
| 8,235,605 B2 | 8/2012 | Kim |
| 8,345,719 B2 | 1/2013 | Moench et al. |
| 8,559,821 B2 | 10/2013 | Wen et al. |
| 8,578,646 B2 | 11/2013 | Joannes |
| 8,605,763 B2 | 12/2013 | Castillo et al. |
| 8,607,495 B2 | 12/2013 | Moore et al. |
| 8,638,387 B2 | 1/2014 | Aizpuru et al. |
| 8,739,454 B2 | 6/2014 | Erdle et al. |
| 8,756,852 B2 | 6/2014 | Kramer et al. |
| 8,833,655 B2 | 9/2014 | McCarty et al. |
| 8,837,877 B2 | 9/2014 | Kimerling et al. |
| 8,850,950 B2 | 10/2014 | Deckard et al. |
| 8,879,146 B2 | 11/2014 | LoRocco et al. |
| 8,887,430 B2 | 11/2014 | Wichner |
| 8,888,491 B2 | 11/2014 | Carter |
| 2003/0012244 A1 | 1/2003 | Krasulick et al. |
| 2004/0121241 A1 | 6/2004 | Kodama |
| 2005/0073690 A1 | 4/2005 | Abbink et al. |
| 2005/0082553 A1 | 4/2005 | Yamamoto et al. |
| 2005/0188583 A1 | 9/2005 | Jackson et al. |
| 2005/0225853 A1 | 10/2005 | Hakansson et al. |
| 2006/0022213 A1 | 2/2006 | Posamentier |
| 2006/0162226 A1 | 7/2006 | Tai |
| 2006/0164704 A1 | 7/2006 | Sieczka et al. |
| 2006/0182441 A1 | 8/2006 | Kish et al. |
| 2008/0010841 A1 | 1/2008 | Gordon |
| 2008/0031294 A1 | 2/2008 | Krishnamoorthy et al. |
| 2011/0031903 A1 | 2/2011 | Nguyen Hoang et al. |
| 2011/0129227 A1 | 6/2011 | Wen et al. |
| 2011/0164633 A1 | 7/2011 | Moench et al. |
| 2011/0228366 A1 | 9/2011 | Liu |
| 2011/0228803 A1 | 9/2011 | Guenter et al. |
| 2013/0016410 A1* | 1/2013 | Futterer ................. G02B 27/14 359/15 |
| 2013/0033746 A1 | 2/2013 | Brumfield |
| 2014/0026464 A1 | 1/2014 | Wiklund |
| 2014/0056322 A1 | 2/2014 | Castillo et al. |
| 2014/0109457 A1 | 4/2014 | Speroni |
| 2014/0130395 A1 | 5/2014 | Scroggins |
| 2014/0160475 A1 | 6/2014 | Kingsbury et al. |
| 2014/0169390 A1 | 6/2014 | Spiekermann |
| 2014/0238429 A1 | 8/2014 | Mizuno et al. |
| 2014/0268323 A1 | 9/2014 | Feinberg |
| 2014/0283431 A1 | 9/2014 | Tuller, Jr. et al. |
| 2014/0290113 A1 | 10/2014 | Thomas et al. |
| 2014/0290114 A1 | 10/2014 | Thomas et al. |
| 2014/0295380 A1 | 10/2014 | Amis et al. |
| 2014/0305022 A1 | 10/2014 | Chung |
| 2014/0305023 A1 | 10/2014 | Moore et al. |
| 2014/0305025 A1 | 10/2014 | Tubb |
| 2014/0315156 A1 | 10/2014 | Averill |
| 2014/0319217 A1 | 10/2014 | Elefante |
| 2014/0334058 A1 | 11/2014 | Galvan et al. |
| 2015/0211876 A1 | 7/2015 | Edelen |

FOREIGN PATENT DOCUMENTS

| | | |
|---|---|---|
| WO | 9201203 A1 | 1/1992 |
| WO | WO-200050836 A1 | 8/2000 |
| WO | WO-2007011803 A2 | 1/2007 |
| WO | WO-2009044387 A2 | 4/2009 |
| WO | 2009136858 A1 | 11/2009 |
| WO | WO-2014056105 A2 | 4/2014 |
| WO | WO-2015009720 A2 | 1/2015 |

OTHER PUBLICATIONS

Fukada, M. et al., "Temperature and current coefficients of lasing wavelength in tunable diode laser spectroscopy," App. Phys B., Aug. 2010; 100(2): 377-382.

Chonko, J. et al., "Using Forward Voltage to Measure Semiconductor Junction Temperature," Keithley Instruments, Inc., Cleveland, Ohio, Feb. 2006, pp. 1-3.

* cited by examiner

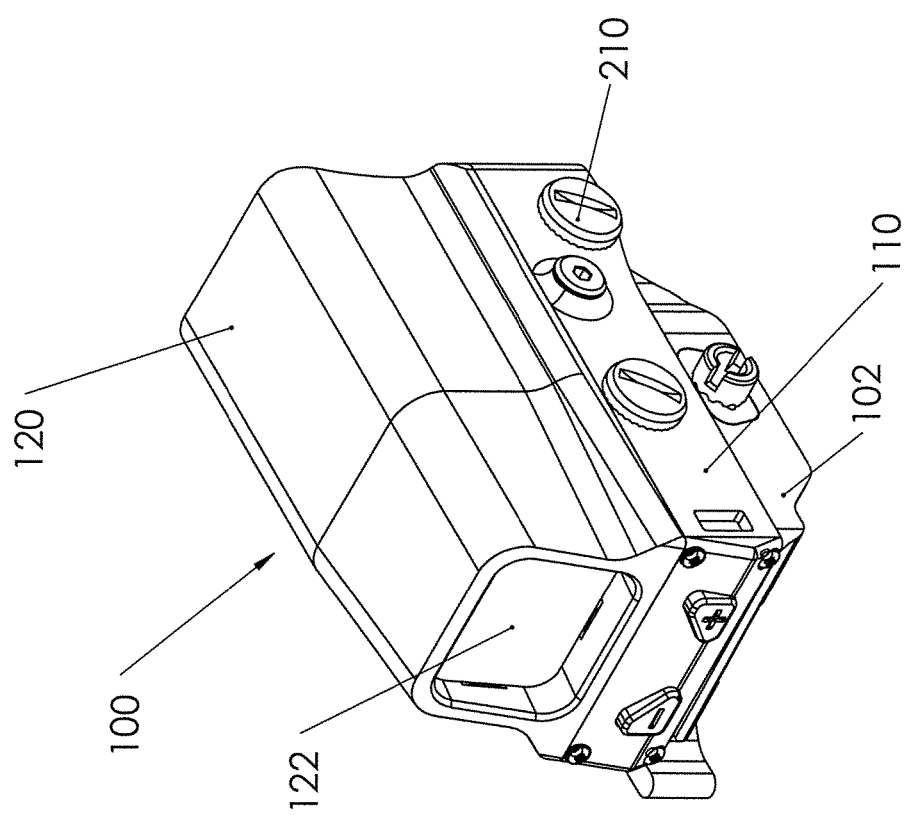

IMAGE PLANE AND WAVELENGTH

FIG. 13

HOLOGRAPHIC SIGHT WITH OPTIMIZED REFLECTION AND IMAGE ANGLES

CROSS REFERENCE TO RELATED APPLICATIONS

This U.S. patent application claims priority to U.S. provisional patent application Ser. No. 62/336,792, filed May 16, 2016, and claims priority to U.S. provisional patent application Ser. No. 62/184,927, filed Jun. 26, 2015, and also claims priority to U.S. provisional patent application Ser. No. 62/279,164, Jan. 15, 2016, the contents of which are incorporated herein in their entirety.

FIELD OF THE INVENTION

This application relates generally to compact holographic weapon sights.

BACKGROUND OF THE INVENTION

There are several types of sights available in the market to enable a user of a weapon such as rifle, shotgun, handgun and submachine gun to aim these weapons. Examples of such sighting devises include laser sights, holographic sights, and "reflex" or "red dot" sights. Holographic sights utilize a holographic optical element (HOE), illuminated by a reconstruction beam, and the HOE reconstructs an image, typically of a reticle. A user looks through the HOE at a targeted object and perceives the reconstructed reticle. FIG. 1A schematically illustrates an example of such a prior art device. A light source 2, typically a laser diode, projects a diverging beam of light 3 which is reflected by a mirror 4 or HOE, such as a grating, creating a reflected beam 5. The reflected beam 5 in this example is also diverging, and may be considered a reconstruction beam. The reconstruction beam 5 illuminates a holographic optical element (HOE) 6 and the HOE 6 reconstructs an image of a reticle. An individual's eye 7 can view the image of the reticle and a target (not shown) through the HOE 6. This sighting device has several disadvantages. The use of diverging light to illuminate an HOE may cause drift of the image plane depth and the position of the reconstructed reticle. Also, the wavelength of light produced by typical laser diodes depends on a number of factors, including the temperature of the laser diode. For example, some laser diodes will exhibit a shift in output wavelength of approximately 0.30 nm/° C. The change in temperature of the laser diode may be due to environmental conditions or due to heating from operation of the diode. The angle of diffraction of an HOE or diffraction grating is wavelength dependent. As such, as the temperature shifts, resulting in a wavelength shift, the position of the reconstructed reticle shifts. This is undesirable. Finally, since the user views the target through the HOE, ambient light may cause a rainbow effect in high efficiency HOEs and the HOE emulsion may have defects that are detectable to the eye. Certain types of HOEs also darken over time.

FIG. 1B schematically illustrates an example of a prior art device with a configuration that compensates for wavelength shift. A light source 10, typically a laser diode, projects a diverging beam of light 11 which passes through a collimating lens 12. This creates a collimated beam of light 13. The collimated beam 13 illuminates a diffraction grating 14. The diffraction grating 14 produces a reconstruction beam 15 that is angled upwardly, in this example, which illuminates an HOE 16. The HOE 16 reconstructs an object beam 17 that is perceived by a user's eye 18. The object beam 17 is angled downwardly, in this example, such that the object beam 17 and the collimated beam 13 are parallel to each other. The grating 14 and HOE 16 are also parallel to each other. While the grating 14 and HOE 16 still suffer from the same dispersion as in the FIG. 1A example, the dispersion of the grating is equal to and in an opposite direction to the dispersion of the HOE, thereby compensating for the wavelength shift. Such a compensation can also be achieved with a grating and HOE that are not parallel as long the dispersion of each is equal and in an opposite direction. This wavelength compensation design is sometimes referred to as an achromat or achromat configuration. This design has the same issue of viewing the target through the HOE. Also, this design can be difficult to package in a compact weapon sight, and the relative position of the various components must be maintained or the image quality or position may suffer.

There have been various attempts to provide wavelength drift compensation properties in a more compact package by folding the light path. Examples are shown in U.S. Pat. Nos. 5,151,800; 5,483,362; 6,490,060; and 7,145,703.

SUMMARY OF THE INVENTION

Certain embodiments of the present invention provide a compact weapon sight in which an HOE is illuminated by a diverging beam of light and the user views a reflection of the HOE in a non-diffractive element (NDE). The relative angles of the reconstruction and object beams of the HOE, and the angles of reflected light, are selected to reduce the visibility of reflected light by a user when the user is viewing the reconstructed reticle, while also reducing the impact of wavelength shifts of the light source. It is preferred that the user not see the reflected light when the user's eye is aligned with a viewing axis of the sight. Certain embodiments of the present invention utilize unequal reconstruction and image beam angles with a customized light source to achieve desired performance levels One embodiment of a holographic gun sight includes a housing having a viewing end and an opposing target end, a viewing path being defined from the viewing end to the target end. A light source is operable to project a light beam along a path. A reflection-type holographic optical element (HOE) having a surface is disposed in the path of the light beam such that the HOE is illuminated by the light beam at an incidence angle defined with respect to a line perpendicular to the surface of the HOE. The HOE reconstructs an object beam with an image of a reticle, the object beam having an object beam angle measured with respect to the line perpendicular to the surface of the HOE. A positive incidence angle and a positive object beam angle are defined as being on opposite sides of the perpendicular line. The absolute difference between the incidence angle of the light beam and the object beam angle is greater than zero and less than or equal to 25 30 degrees.

In some versions, the absolute difference between the incidence angle of the light beam and the object beam angle is greater than five degrees. In further versions, the absolute difference between the incidence angle of the light beam and the object beam angle is greater than 10 degrees and less than or equal to 20 degrees.

In some versions, the sight further includes a non-diffraction element (NDE) reflecting the image of the reticle, the non-diffraction element being disposed in the viewing path such that a user views a target along the viewing path through the non-diffraction element from the viewing end. The HOE is not disposed in the viewing path. The non-diffraction element (NDE) may be selected from the group consisting of a partial mirror, a glass element and an optical element with a dichroic film coating.

The light source may be a laser diode or a vertical-cavity surface-emitting laser diode (VCSEL).

In some versions, the sight further includes a grating disposed in the path of the light beam from the light source, the grating reconstructing a beam and illuminating the HOE with the reconstructed beam. The light path is defined as extending along the path of the light beam and the path of the reconstructed beam. Alternatively, a mirror may be disposed in the path of the light beam from the light source, the mirror reflecting the light beam onto the holographic optical element (HOE) and illuminating the holographic optical element (HOE).

In some versions, the light beam illuminating the holographic optical element is a non-collimated light beam.

In certain versions, the light source directly illuminates the HOE without any intermediate optical element.

In certain versions, the sight further comprising a base configured to attach to a weapon, the base having a lower surface and an upper surface, the lower surface configured to engage the weapon or the optical device.

Another embodiment of the present invention provides an adjustable holographic sight having a housing with a viewing end and an opposing front end, a viewing path being defined from the viewing end to the front end. A light source is operable to project a light beam along a path. A reflection-type holographic optical element (HOE) having a surface is disposed in the path of the light beam such that the HOE is illuminated by the light beam at an incidence angle defined with respect to a line perpendicular to the surface of the HOE. The HOE reconstructs an object beam with an image of a reticle, the object beam having an object beam angle measured with respect to the line perpendicular to the surface of the HOE. A positive incidence angle and a positive object beam angle are defined as being on opposite sides of the perpendicular line. The absolute difference between the incidence angle of the light beam and the object beam angle is greater than zero and less than or equal to 30 degrees. A non-diffraction element (NDE) reflects the image of the reticle, the non-diffraction element being disposed in the viewing path such that a user views a target along the viewing path through the non-diffraction element from the viewing end. An adjustment mechanism is operable to move the non-diffraction element relative to at least one axis, thereby providing a windage and/or elevation adjustment.

In certain versions, the absolute difference between the incidence angle of the light beam and the object beam angle is greater than five degrees. In further versions, the absolute difference between the incidence angle of the light beam and the object beam angle is greater than 10 degrees and less than or equal to 20 degrees.

The sight may be a weapon sight or a sight for an optical instrument.

In some versions, the sight further includes a base having a lower surface and an upper surface, the lower surface of the base configured to engage the weapon or the optical device. A carrier has a lower surface and an upper surface, the lower surface of the carrier being disposed near the upper surface of the base. The holographic optical element (HOE) and the light source are disposed on the upper surface of the carrier. A vertical pivot bolt connects the carrier to the base such that the carrier is pivotally movable in a generally horizontal plane about a vertical axis defined by the pivot bolt. The adjustment mechanism includes a windage adjustment mechanism disposed in the carrier, the windage adjustment mechanism having a windage screw operable to pivotally move the carrier about the vertical axis.

The sight may also include an element holder supporting the non-diffraction element (NDE) disposed at an angle with respect to the viewing path, the element holder being pivotal with respect a transverse axis. The adjustment mechanism may include an elevation adjustment mechanism operable to pivot the element holder with respect to the transverse axis. The elevation adjustment mechanism may include an elevation screw and an elevation nut attached to the elevation screw, the elevation nut having an upper surface and a lower surface. The upper surface has an angle, and the upper surface of the elevation nut is in contact with the element holder such that transverse movement of the elevation nut pivotally moves the element holder. A resilient member biases the element holder into contact with the elevation nut.

The light source may be a laser diode or a vertical-cavity surface-emitting laser diode (VCSEL) and the non-diffraction element (NDE) may be a partial mirror, a glass element and an optical element with a dichroic film coating.

In some versions, the sight has an operating temperature range with a minimum temperature and the light beam from the light source has a wavelength that decreases as the temperature of the light source decreases. The HOE is configured such that an image plane depth of the sight is a predetermined real image plane depth at a wavelength corresponding to the maximum temperature. A real image plane depth is defined as an image plane depth perceived by a user viewing the image of the reticle through the viewing end of the gun sight and the wavefront of the light image beam is concave toward the viewing end of the sight.

A further embodiment of the present invention provides a method of setting an image plane depth of a holographic gun sight having a viewing end and a target end. The method includes providing a holographic gun sight in accordance with any embodiment herein, wherein the light beam produced by the light source has a wavelength that decreases as the temperature of the light source decreases. An operating temperature range is defined, having a maximum and a minimum temperature. A wavelength of the light beam is determined corresponding to the maximum and minimum temperature. A minimum image plane depth is selected for the gun sight. The gun sight is such that the image plane depth is real and equal to the minimum image plane depth at the wavelength corresponding to the maximum temperature. A real image plane depth is defined as an image plane depth perceived by a user viewing the image of the reticle through the viewing end of the gun sight and the wavefront of the image beam is concave toward the viewing end of the gun sight.

In some versions, the step of configuring the gun sight comprises creating the HOE such that the image plane depth is real and equal to the minimum image plane depth at the wavelength corresponding to the maximum temperature.

In some versions, the operating temperature range has a defined minimum temperature, wherein the sight is configured such that the image plane depth is virtual and equal to or greater than the minimum image plane depth at a wavelength corresponding to the minimum temperature.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the drawings:

FIG. 2A is a front perspective view of a sight in accordance with an embodiment of the present invention;

FIG. 13 is a table providing calculations concerning performance characteristics of a sight according to certain embodiments of the present invention.

DETAILED DESCRIPTION OF THE INVENTION

Figure 2B:
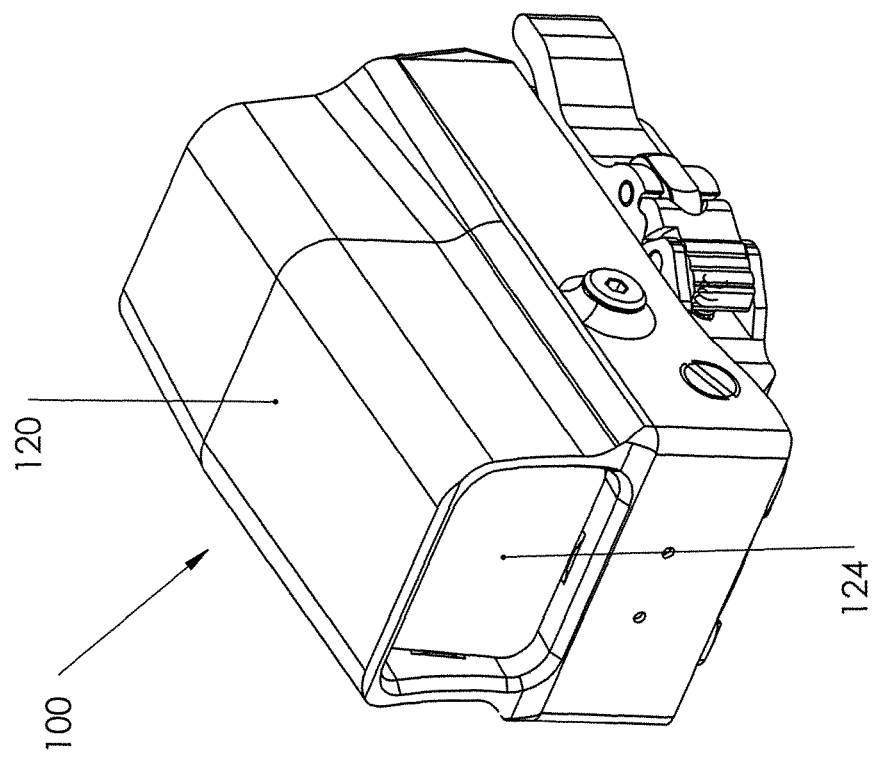
FIG. 2B is a rear view of the sight of FIG. 2A.

FIGS. 2A and 2B provide front and back perspective views of a sight 100 in accordance with certain embodiments of the present invention. The sight 100 has a base 102 configured to engage a weapon. This may be accomplished in a variety of ways, including the use of a quick release assembly configured to engage a rail of the weapon. Alternatively, the base 102 may be integrated with a weapon. In this embodiment, a carrier 110 is connected adjacent an upper surface of the base 102. The position of the carrier 110 may adjustable relative to the base 102 to adjust for windage and/or elevation. Embodiments of the present invention may be used in combination with any of the windage and elevation adjustment designs shown in Applicant's patent applications, U.S. Ser. No. 62/184,927 and 62/279,164, the entire contents of all of which are incorporated herein by reference. Embodiments of the present invention may also be used with other adjustment designs. In the present embodiment, the carrier 110 is rotatable with respect to the base 102 for windage adjustment but elevation adjustment is accomplished separately, as will be described.

A hood 120 is disposed on top of the carrier 110 and has a front protective lens 122 and a rear protective lens 124. In this disclosure, the terms "front" or "forward" refer to the direction toward the user and "rear" or "rearward" refers to the direction toward the target. The front protective lens may be said to define a viewing end of a housing of the sight and the rear protective lens maybe said to define a target end of the housing, with a viewing path being defined from the viewing end to the target end. Some embodiments may lack a front and/or rear protective lens with the housing just having openings or windows at the viewing and target ends. In the example of FIGS. 2A and 2B, the hood 120 and lenses 122 and 124 cooperate to enclose an internal area above the carrier 110.

Figure 3:
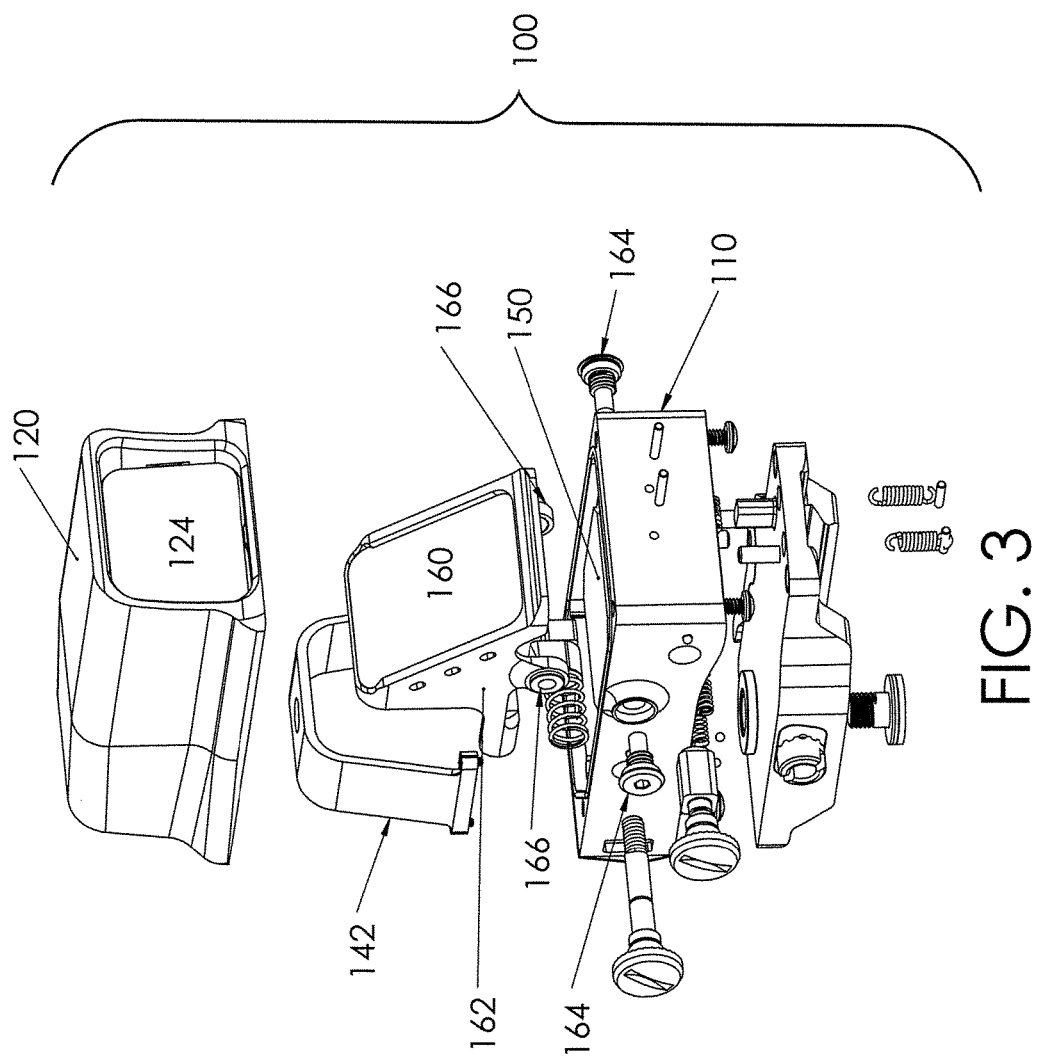
FIG. 3 is an exploded perspective view of the sight of FIGS. 2A and 2B.
Figure 4:
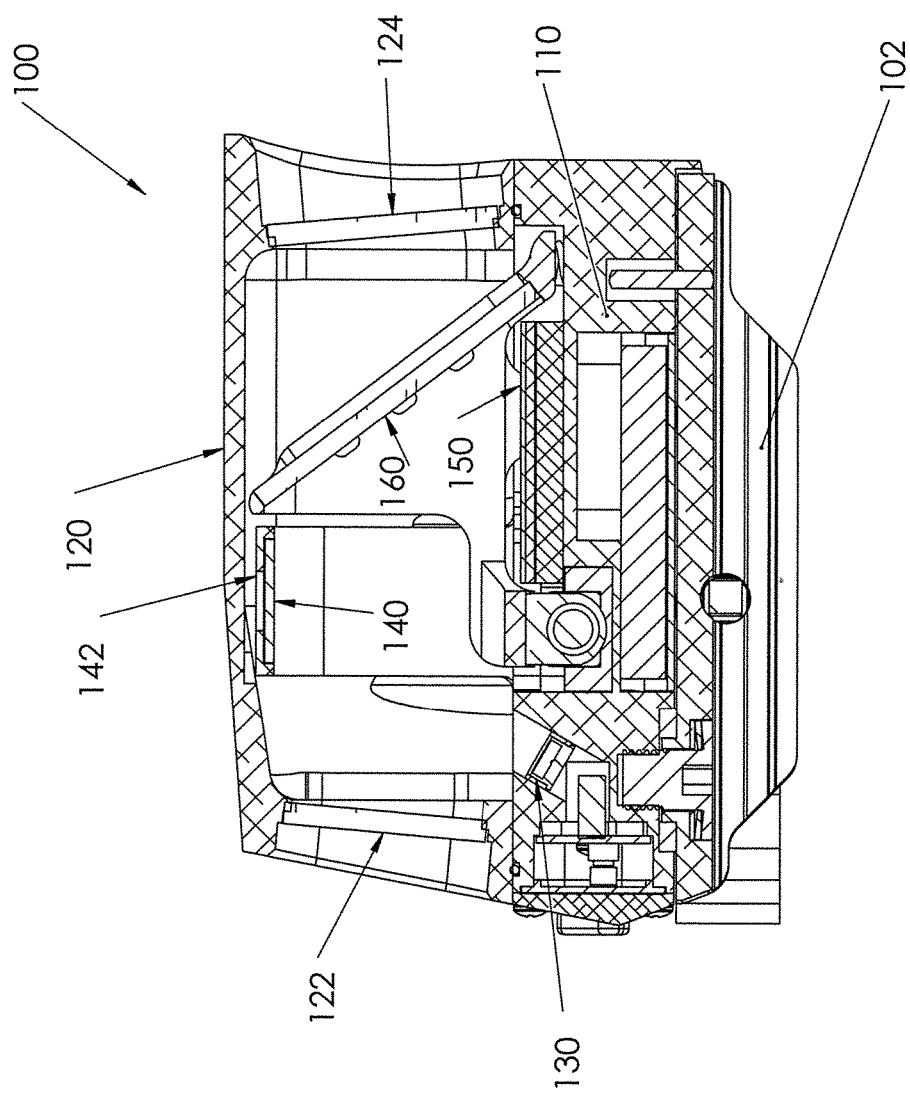
FIG. 4 is a cross sectional view of the sight of FIGS. 2A, 2B and 3.

Referring now to FIGS. 3 and 4, some of the internal configuration of the sight 100 will be described. FIG. 3 provides an exploded view and FIG. 4 provides a cross sectional view. A light source 130 is supported on the carrier 110 towards the forward end. In certain embodiments, the light source is a laser diode such as a vertical-cavity surface-emitting laser diode (VCSEL), though other light sources may be used. The light source illuminates a mirror 140 that is supported by a mirror support 142, best shown in FIG. 3. The mirror support 142 is arch-shaped and extends upwardly from the carrier 110. The mirror is not shown in FIG. 3 but, as shown in FIG. 4, mounts to the underside of the arch-shaped mirror support 142 adjacent the top of the hood 120. This design isolates the mirror 140 from the hood 120 such that damage to the hood, or impacts against the hood, are less likely to adversely affect the mirror. Alternatively, the mirror could be mounted to the hood itself. An HOE 150 is also mounted to the carrier 110, rearwardly of the light source 130, such that light from the light source is reflected by the mirror 140 onto the HOE 150. In this embodiment, the mirror and the HOE are both disposed generally horizontally (with respect to a reference frame defined by the carrier and/or the viewing path). In this embodiment, the light source 130 is disposed generally at the same height as the HOE 150.

A non-diffraction element (NDE) 160 is supported at an angle relative to horizontal and generally above the HOE 150. As used herein, a holographic optical element (HOE) is defined as an optical element (such as a lens, filter, beam splitter, or diffraction grating) that is produced using holographic imaging processes or principles. Any embodiment of this invention may also have a non-diffraction element (NDE), which may consist of a partial mirror, glass or dichroic film coating. As used herein, an NDE is defined as an optical element for redirecting a pattern of light while preserving wavefront and diffracted pattern characteristics. As such, an NDE is not an HOE. When the HOE reconstructs the image of a reticle, this image may be reflected in or by the NDE. Thus, the NDE may serve two functions for the sight. The NDE reflects the image such that it may be viewed by a user's eye. Additionally, a user may view a target through the same NDE such that the reticle is superimposed on the target. This facilitates a user for aiming the weapon or optical device. Therefore, a user views the reticle and the target through the NDE, not through an HOE. The NDE reflects more light and avoids a rainbow effect.

The NDE 160 is supported by a NDE holder 162 which is pivotally supported by the carrier 110 for rotation about a transverse axis. The pivot axis in this embodiment is defined by pivot bolts 164 that pass through openings in the sides of the carrier 110 and engage pivot tabs 166 extending downwardly from the remainder of the NDE holder. As will be clear to those of skill in the art, pivoting the holder 162 will cause the reflected image of a reticle, reconstructed by the HOE 150, to move upwardly and downwardly. Thereby, pivoting of the holder 162 provides an elevation adjustment. It is noted that the positions of the light source 130, mirror 140 and HOE 150 are fixed relative to one other and relative to the carrier. This maintains alignment and performance.

Windage and elevation adjustments are achieved without changing the relative positions of these elements.

Figure 5:
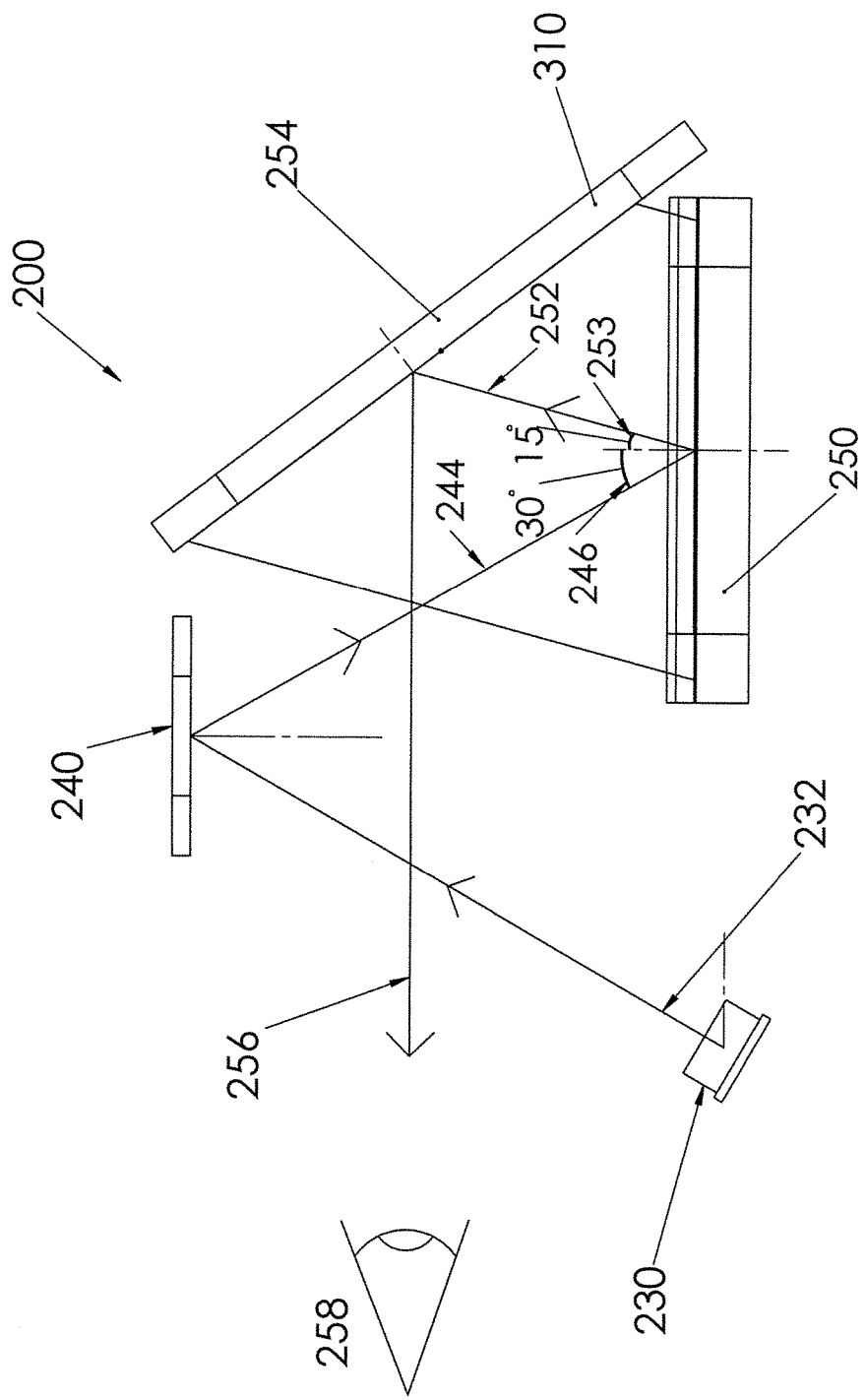
FIG. 5 is a light path diagram for an embodiment of the present invention.

FIG. 5 provides a schematic representation of a particular embodiment of a sight in accordance with the present invention and will be used to describe the light and image paths for such embodiments. The sight 200 has a light source 230, preferably a VCSEL that produces a beam of light 232. The light beams in this Figure show only a central axis of the beam but it is preferred that the beam 232 is a diverging beam of light, which in some versions may be coherent light. All references herein to a beam angle refer to the central axis of the beam, generally illustrated with heavier line weight in the Figures. The position of the light source 230 is consistent with mounting the light source on a carrier such as in FIGS. 2-4. The beam 232 is angled upwardly and rearwardly. A mirror 240 is generally horizontal and disposed above and rearwardly of the light source, and positioned such that it is illuminated by the light beam 232. Preferably, the light beam 232 diverges sufficiently to illuminate all or substantially the entire mirror 240. The light beam 232 may illuminate an area larger than the mirror 240, in which case the mirror will act to choke down the light beam by not reflecting all of it. The mirror 240 reflects the light beam 232, creating beam 244. The beam 244 may be referred to as a reconstruction beam, since it will illuminate an HOE for reconstruction of an object beam. The beam 244 is also diverging.

Figure 1A:
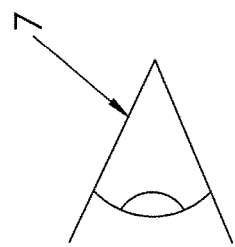
FIG. 1A is a light path diagram of an example of a prior art sighting device.
Figure 1A:
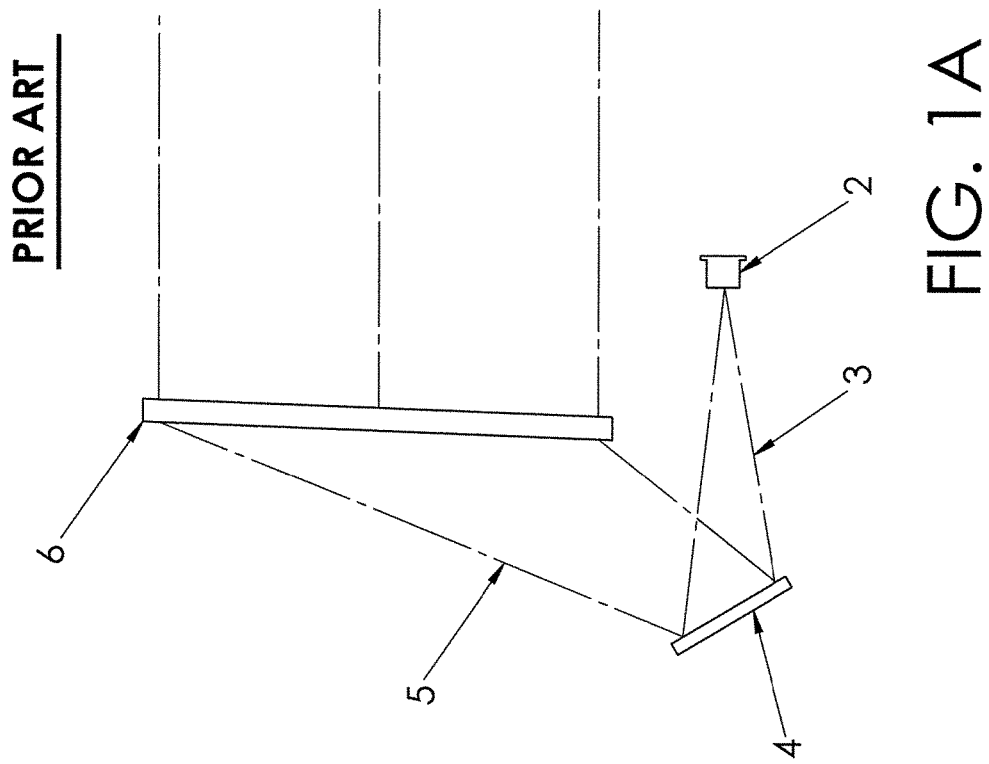
Figure 1B:
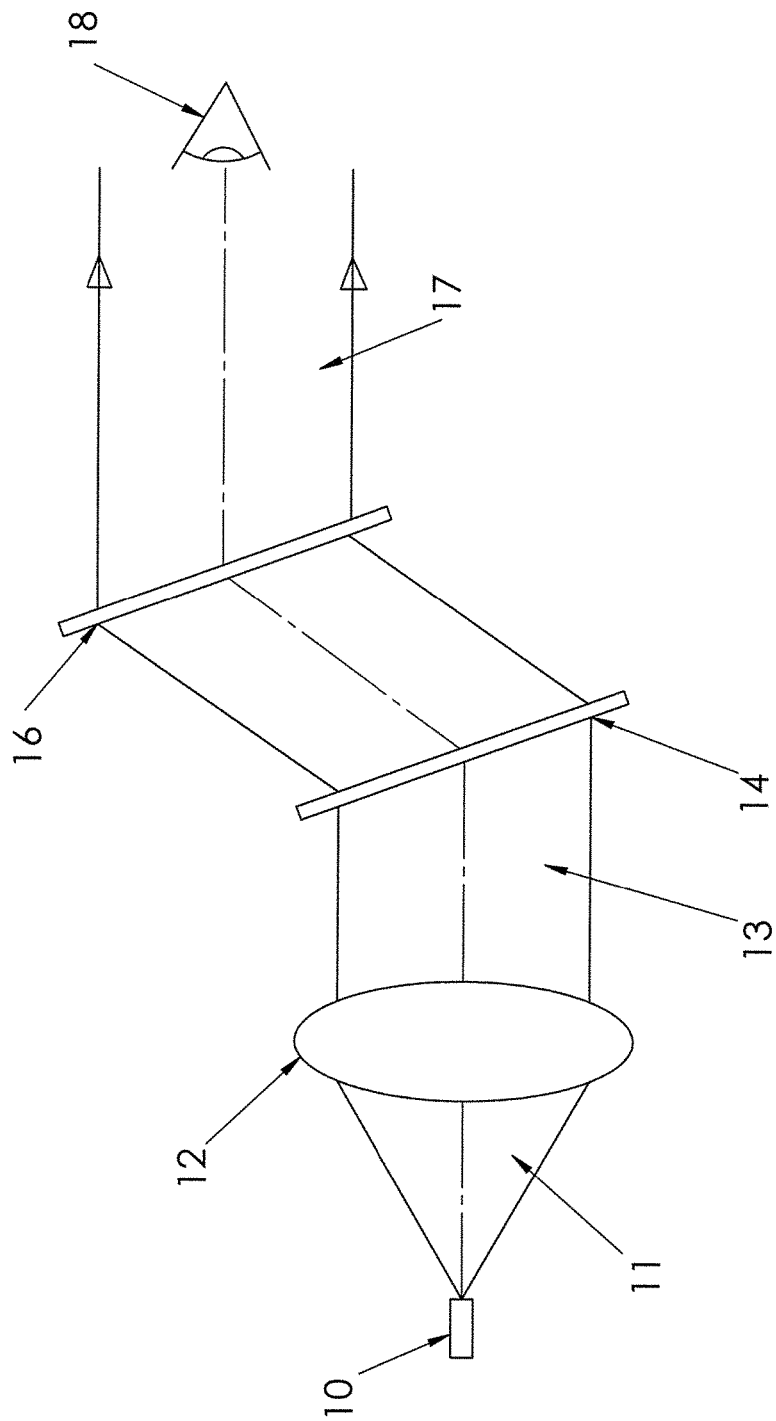
FIG. 1B is a light path diagram of another example of a prior art sighting device.

An HOE 250 is generally horizontal and at about the same height as the light source 230. The HOE 250 is positioned consistently with being mounted on a carrier as in FIGS. 2-4, and positioned such that it is illuminated by the reconstruction beam 244. Preferably the light beam 244 illuminates all or substantially all of the HOE 250. The light beam may illuminate an area larger than the HOE, in which case the HOE will choke down the light beam 244 to the size of the HOE by not reflecting or otherwise making use of the light beam outside the area of the HOE. The HOE 250 reconstructs an object beam 252, typically an image of a reticle. A NDE 254 is disposed above and at an angle to the HOE 250 such that the object beam 252 is reflected as a reflected object beam 256 to the user's eye 258. Element 252 may also represent a viewing path for the sight 200, though the direction of the viewing path is defined opposite to the direction of the object beam. As shown, the HOE is a reflection-type HOE, meaning that the reconstruction beam 244 illuminates the upper surface and the image beam 252 utilized by the sight 200 extends from this same upper surface. Referring back to FIG. 1B, this prior art sight utilized transmission-type HOEs wherein the image beam extends from the surface opposite to the surface illuminated by the light beam.

Figure 6:
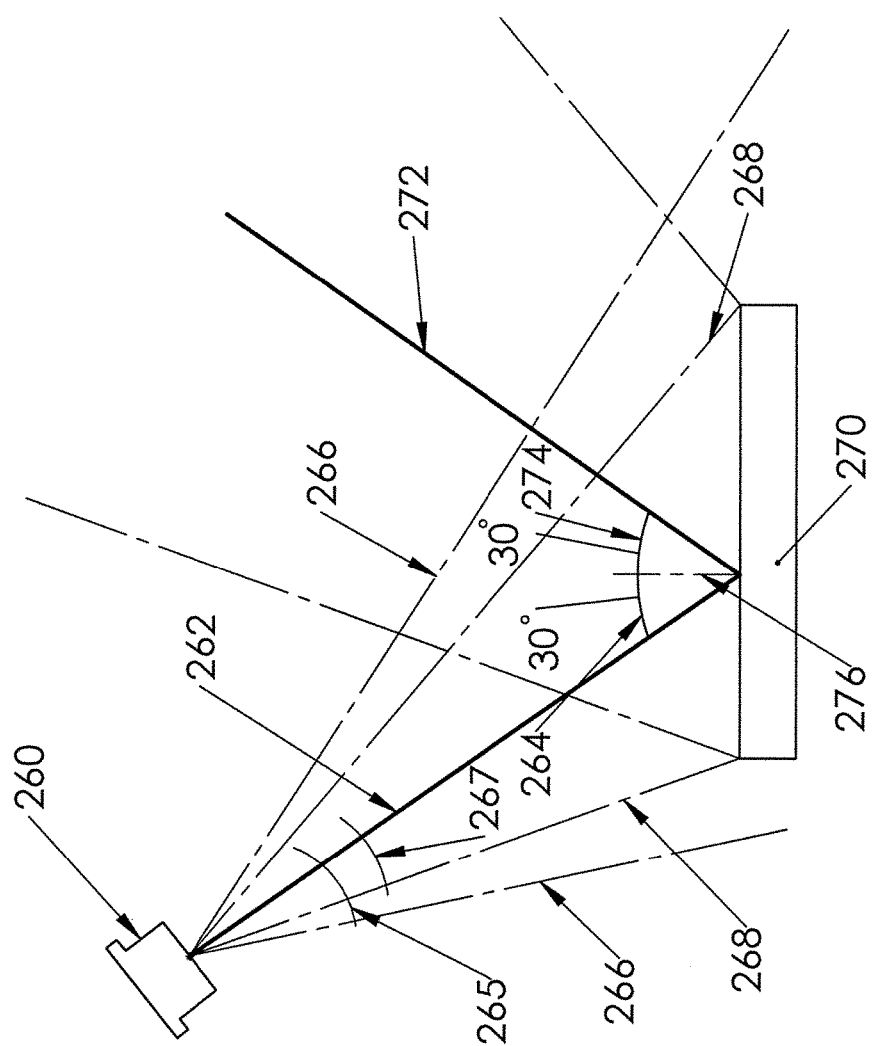
FIG. 6 is a light path diagram illustrating reflection of a light beam illuminating an HOE.
Figure 7:
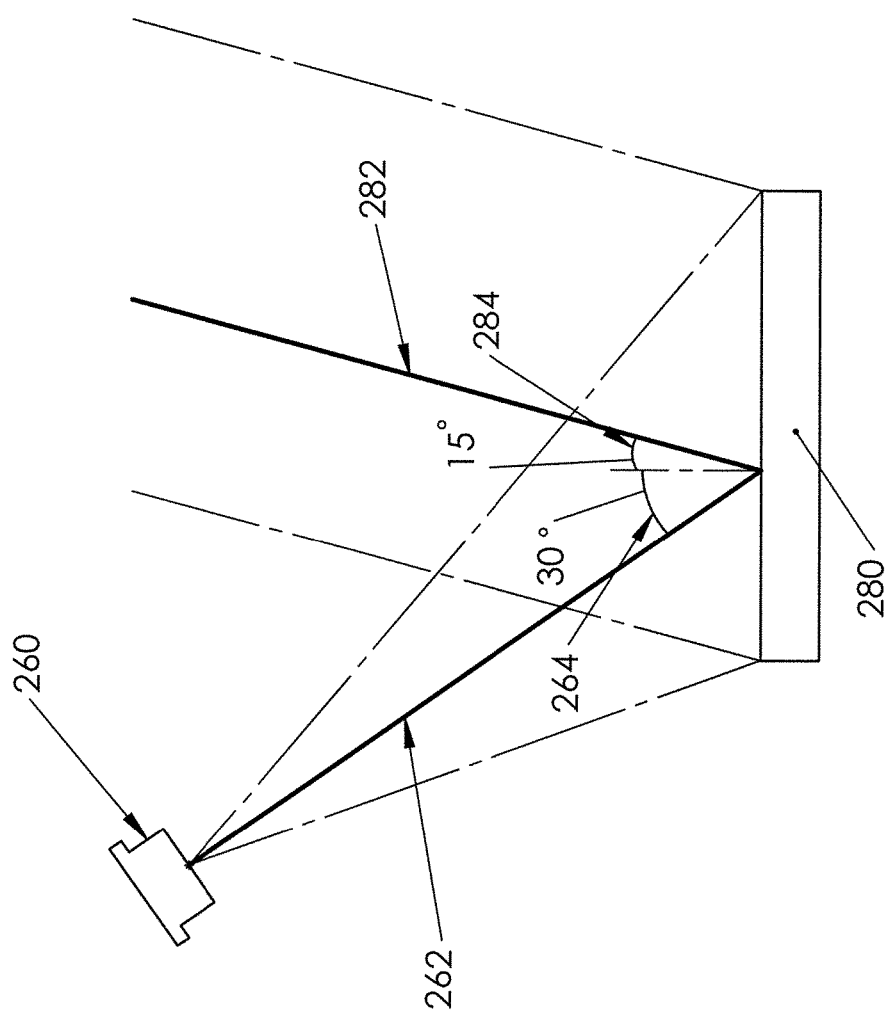
FIG. 7 is a light path diagram illustrating an image beam reconstructed by an HOE.

For ease of explanation, reference is now made to FIGS. 6 and 7. FIG. 6 shows a light source 260 that projects a diverging beam of light 262. The beam of light 262 illuminates a mirror 270, which creates a reflected beam of light 272, which is also diverging. Physics dictates that the angle of incidence 264 will be equal to the angle of reflection 274. The angle of incidence 264 and the angle of reflection 274 are both measured with respect to a line 276 extending perpendicular to the surface of the mirror 270. For purposes of this disclosure, a positive angle of incidence and a positive angle of reflection are on opposite sides of the perpendicular line 276. In this illustration, the beam of light 262 illuminates an area larger than the mirror 270. The light source 260 and beam 262 may be said to have a divergence angle 265 corresponding to the outer edges 266 of the diverging beam. However, since only a portion of the diverging beam is reflected by the mirror, the effective divergence angle, also referred to as a choked angle 267, is smaller, corresponding to the outer edges 268 of the portion of the light beam that will be reflected by the mirror 270. As such, the mirror acts to limit the effective divergence angle. As will be clear to those of skill in the art, the divergence angle 265 may not be well defined, since light may fall off at the edge rather than having a sharp termination.

Referring now to FIG. 7, the same light source 260 is shown projecting the same diverging beam of light 262. This time only the effective portion of the diverging beam is illustrated. In FIG. 7, the light beam illuminates an HOE 280 and the HOE reconstructs an object beam 282. Depending on how the HOE was recorded or created, the object beam 282 may be projected at a different angle than a reflected beam. In FIG. 7, the beam of light 262 illuminating the HOE may be referred to as a reconstruction beam, and the angle of incidence is also defined as a reconstruction beam angle 264. The angle at which the object beam 282 is projected from the HOE is defined as an object beam angle 284. In this illustration, the object beam angle 284 is smaller than the reconstruction beam angle 264 but an HOE may be created with just about any combination of reconstruction beam angle and object beam angle. The key point is that these angles do not need to be equal to each other. However, the dispersion of the HOE is dependent on the difference between the reconstruction beam angle and the object beam angle. If these angles are equal, there is no dispersion and a shift in the wavelength of the reconstruction beam will not cause a change in the object beam angle. However, this will cause reflected light from the light source to be directed into the user's eye. As clear to those of skill in the art, an HOE also acts as a mirror and reflects some portion of the reconstruction beam. This reflected light beam is reflected at an angle of reflection that is equal to the angle of incidence. If an HOE is created having equal reconstruction beam and object beam angles, the object beam with be projected from the HOE at the same angle as light is reflected from the surface of the HOE. In such a case, a user viewing the object beam will also see the light source. If a diverging source is used, this reflected light is undesirable and may interfere with use of the sight. An alternative approach is provided in Patent Application Ser. No. 62/269,657 filed Dec. 18, 2016. As described therein, equal reconstruction and object beam angles may be used with a collimated light source. The light from the light source is reflected toward the user's eye but appears as a dot that may be "hidden" in the reticle pattern.

Referring again to FIG. 5, the reconstruction beam angle 246 is larger than the object beam angle 253, and therefore the object beam angle is smaller than the angle of reflection, not shown. As with the angle of reflection, a positive image beam angle is defined as being on a side of the line 276 opposite the angle of incidence or reconstruction beam angle. An HOE may be constructed such that the object beam projects from the HOE at an angle on the same side of the line 276 as the reconstruction beam but, as used herein, such an object beam would be defined as having a negative object beam angle. In certain embodiments, the use of object beam angles different from the angle of reflection allows a user to view the object beam without also seeing the reflected light beam from the light source.

Figure 8:
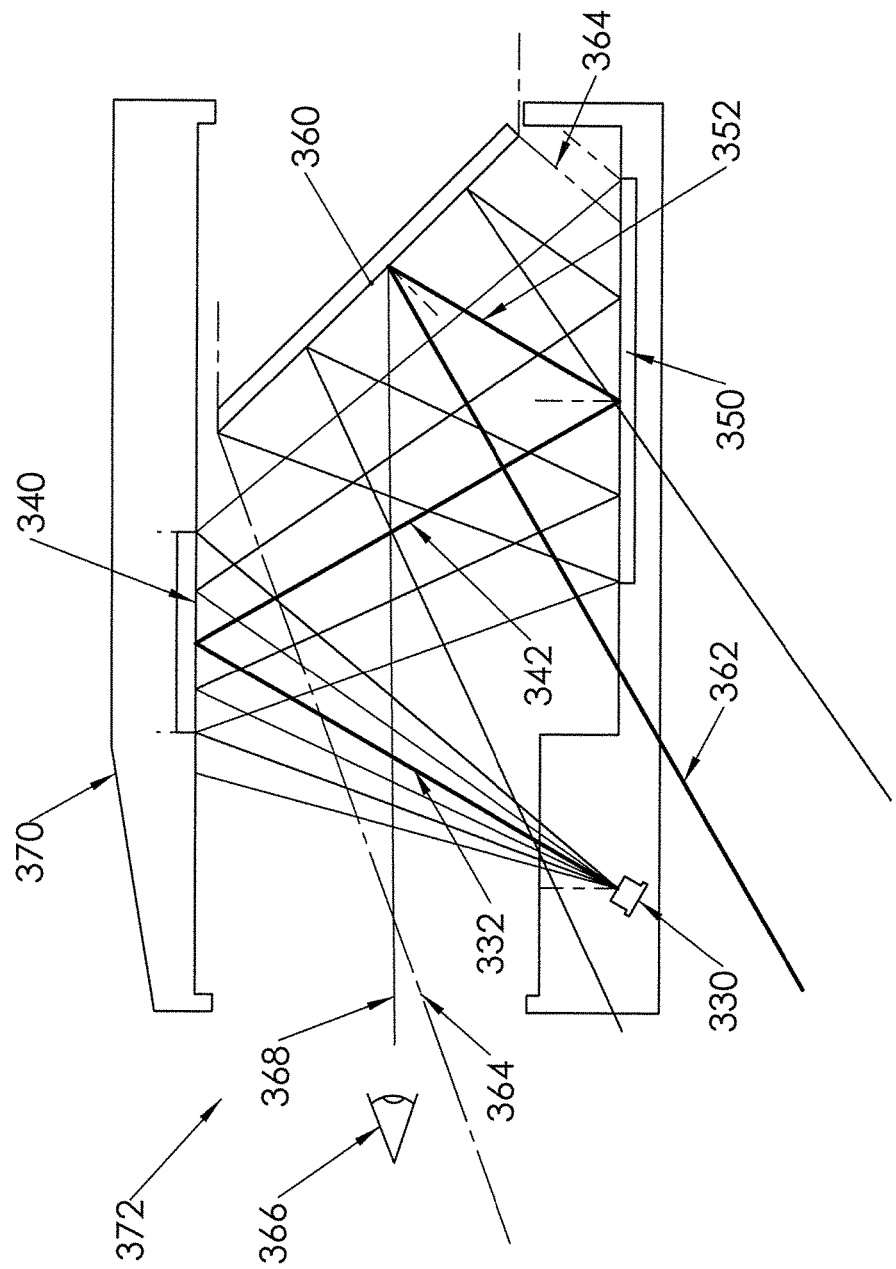
FIG. 8 is a light path diagram illustrating the path of a reflected light bean in a sight according to the present invention.
Figure 9:
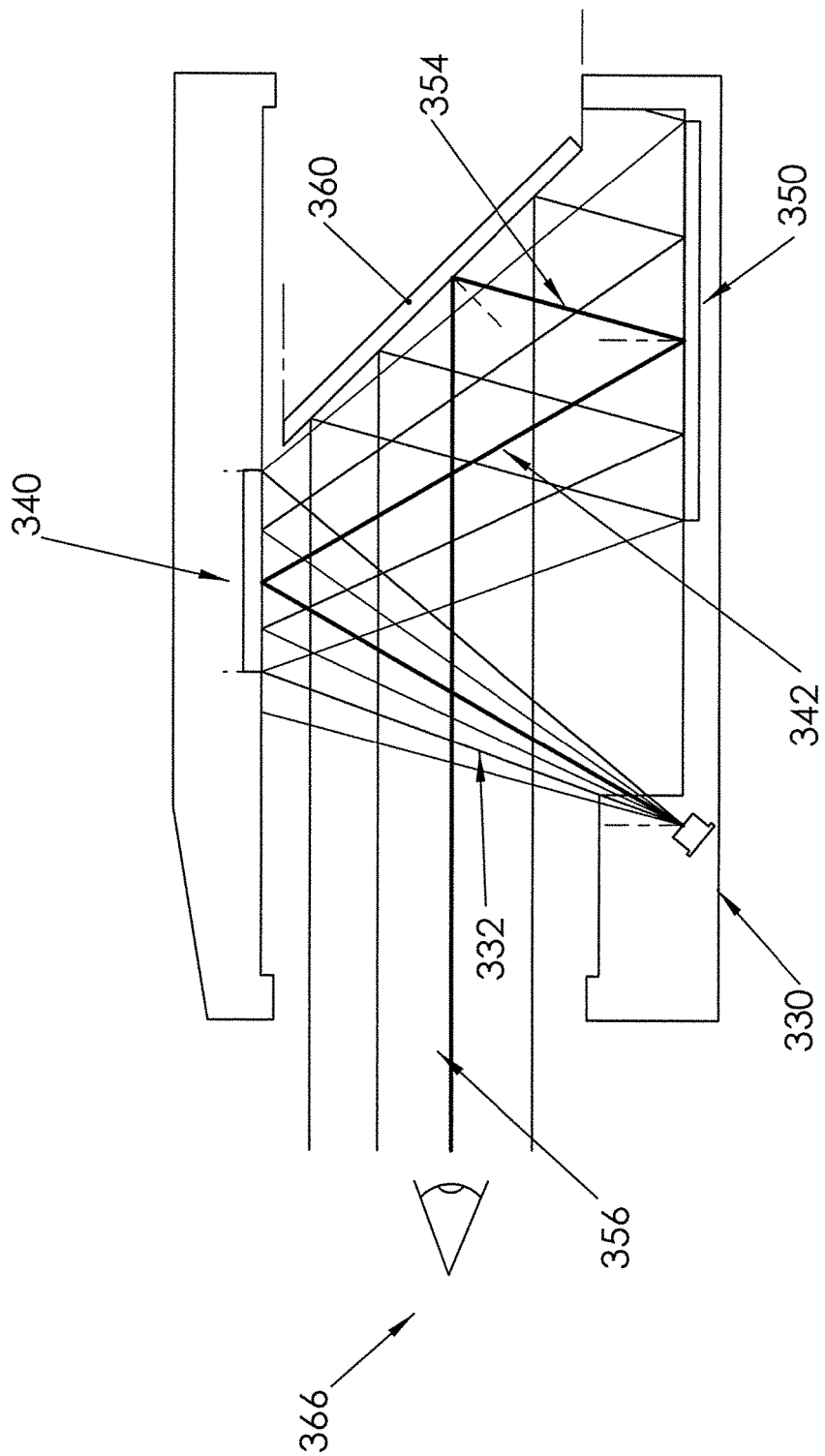
FIG. 9 is a light path diagram illustrating the path of an image beam in a sight according to the present invention.

Referring now to FIGS. 8 and 9, the light paths for reflected light and a reconstructed object beam are compared. In FIG. 8, a light source 330 projects a diverging beam of light 332 and illuminates a mirror 340. The light source illuminates an area larger than the mirror and is therefore choked down to a choked angle or an effective angle of divergence. The mirror 340 reflects a reflected beam 342 which illuminates an HOE 350. In this Figure, the path is illustrated only for light reflected from the HOE, as if it is a mirror. It is understood that not all light is reflected. The reflected light beam 352 then illuminates an NDE 360 and is reflected as a reflected light beam 362. The HOE and/or the NDE may be smaller than the light beam and act to further choke the light beam. As used herein, the term "effective divergence angle means the divergence angle of the light beam after all choking. Angles are determined with respect to a central axis of the effective beam, after choking. As shown, the reflected light beam 362 is angled downwardly. Element number 362 points to the central axis of the reflected light beam. The outer edge of the reflected light beam is indicated by element number 364. As shown, the edge 364 of the reflected light beam 362 extends below the user's eye 366, when it is aligned with the viewing path 368. The housing 370, such as defined by a hood, may have a viewing window 372 that is sized to prevent the majority or entirety of the reflected light beam 362 from projecting out of the housing.

In FIG. 9, the same light source 330 is shown, with the diverging beam of light 332 illuminating the mirror 340 and the reflected beam of light 342 illuminating the HOE 350. However, this Figure shows the reconstructed object beam 354 being projected from the HOE at a shallower angle than the reflection angle. This object beam is reflected by the NDE 360 and travels generally along the viewing path to the user's eye 366.

Figure 10:
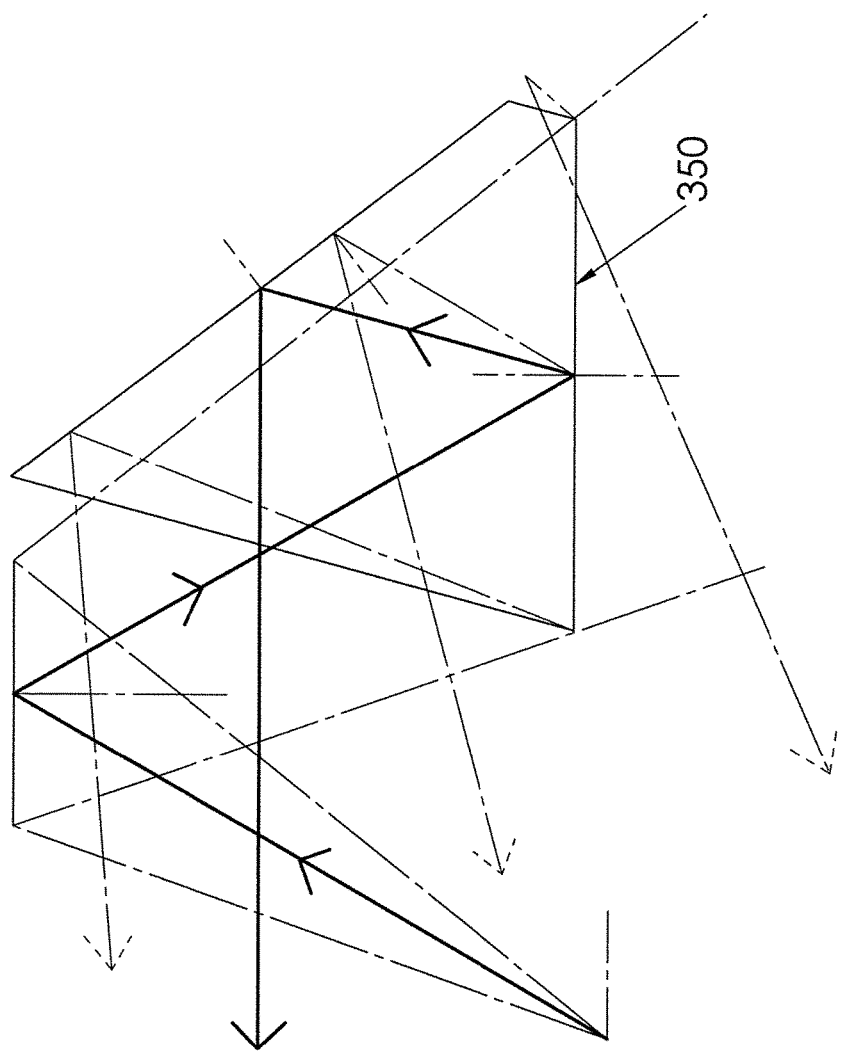
FIG. 10 is a light path diagram illustrating both a reflected beam and an image beam.
Figure 10:
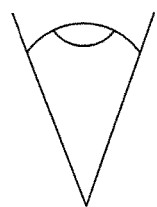

FIG. 10 is a simplified schematic showing the combination of reflected and reconstructed beams projected from the HOE 350. The reconstructed object beam is shown in solid lines and the reflected beam is shown in dashed lines.

An HOE will cause some dispersion depending on the angles of the reconstruction and image beams. The HOE is created with a desired image beam angle, which will result when that HOE is illuminated with the predetermined wavelength of light at a predetermined reconstruction beam angle. Dispersion is a change in the actual image beam angle, as compared to the desired beam angle, that results from changes in the wavelength of the reconstruction beam. As the color (i.e. wavelength) of the light source, and therefore the reconstruction beam, shifts, the dispersion of the HOE increases and the image beam angle shifts from the desired angle. The greater the difference between the predetermined reconstruction beam angle and the desired object beam angle, the greater the dispersive effects of the HOE. In an HOE with very small differences between the predetermined reconstruction and desired image beam angles, wavelength shifts will cause a small shift in the actual image beam angle. In an HOE with larger differences between the predetermined reconstruction and desired image beam angles, the same wavelength shift will cause a greater shift in the actual image beam angle. In some embodiments of the present invention, the difference between the angles is limited to no more than 30 degrees, and in certain embodiments no more than 20 degrees, and in further embodiments the difference is approximately 15 degrees. At the same time, the difference between the reconstruction beam angle and the object beam angle is preferably great enough to avoid a user seeing the reflection of the light source, particularly if the user's eye is generally aligned with the viewing path or axis. In some embodiments, the difference between the reconstruction beam angle and the object beam angle is at least 5 degrees, and in certain embodiments the difference is at least 10 degrees, and in further embodiments it is approximately 15 degrees. For some embodiments, values in these ranges provide a sight wherein the user can view the object beam without viewing the reflected light beam while also limiting dispersion to a level that avoids the needs for an achromatic arrangement or a wavelength-stabilized light source. It is noted that the angle difference indicated above are absolute differences. For example, in one version of a sight, the angle of incidence for the HOE is 30 degrees and the image beam angle is 15 degrees such that the difference between the image beam angle and the angle of incidence (and also the reflection angle) is 15 degrees. These angles may be reversed, with an appropriate reconfiguration of the sight, such that the angle of incidence is 15 degrees and the image beam angle is 30 degrees, and the difference (i.e. absolute difference) is still 15 degrees. For purposes of this invention, the image beam angle corresponds to the angle designed into the HOE, or used when forming the HOE. As noted, this angle will change slightly with changes in wavelength.

In some embodiments of the present invention, the light source is a VCSEL with a wavelength of 670 nm+/−2 nm and a spectral width of 1 nm.

Figure 11:
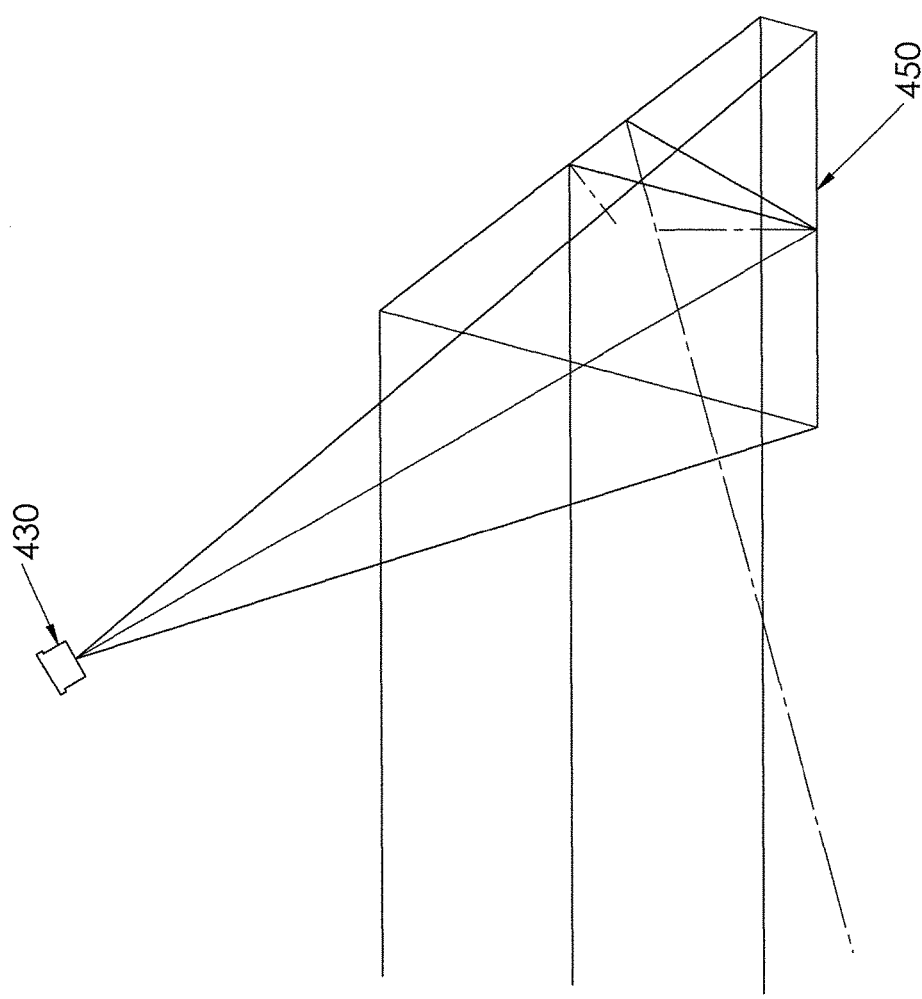
FIG. 11 is a light path diagram for an alternative embodiment of a sight according to the present invention.

The configuration shown in the prior Figures allows a user to view the object beam without viewing the reflected light source, while limiting dispersion to an acceptable level. But, the present invention is not limited to this configuration. Instead, the present invention may be practiced with other configurations that achieve similar results. FIG. 11 illustrates a version wherein the light path is less folded and does not use a mirror. Instead, a light source 430 directly illuminates an HOE 450 without any other optical elements disposed therebetween. The remainder of the sight is the same as before. In further alternatives, the angles between various elements may be other than as shown, such as the mirror and HOE not being parallel to each other and/or not be generally horizontal. In alternative embodiments, a grating may replace the mirror, with the grating reconstructing a light beam that illuminates the primary HOE. In such a case, the reconstructed light beam is considered a continuation of the light beam from the light source and the light path of the light beam (original or reconstructed) includes the path of the reconstructed light beam.

For certain embodiments, the use of a reflection HOE is preferred as it provides better efficiency. It is also preferred that NDE is a dichroic mirror that reflects wavelengths corresponding to the object beam and passes other wavelengths, but other NDEs may be used. It is further preferred that diverging light illuminates the HOE as this avoids the need for a collimating lens or element, allowing more compact positioning. The use of a mirror, if light is to be reflected to the HOE, is preferred, but in certain embodiments the mirror could be replaced with a grating. It is noted that in some embodiments only a single HOE is used and the HOE is not in the viewing path.

Figure 12:
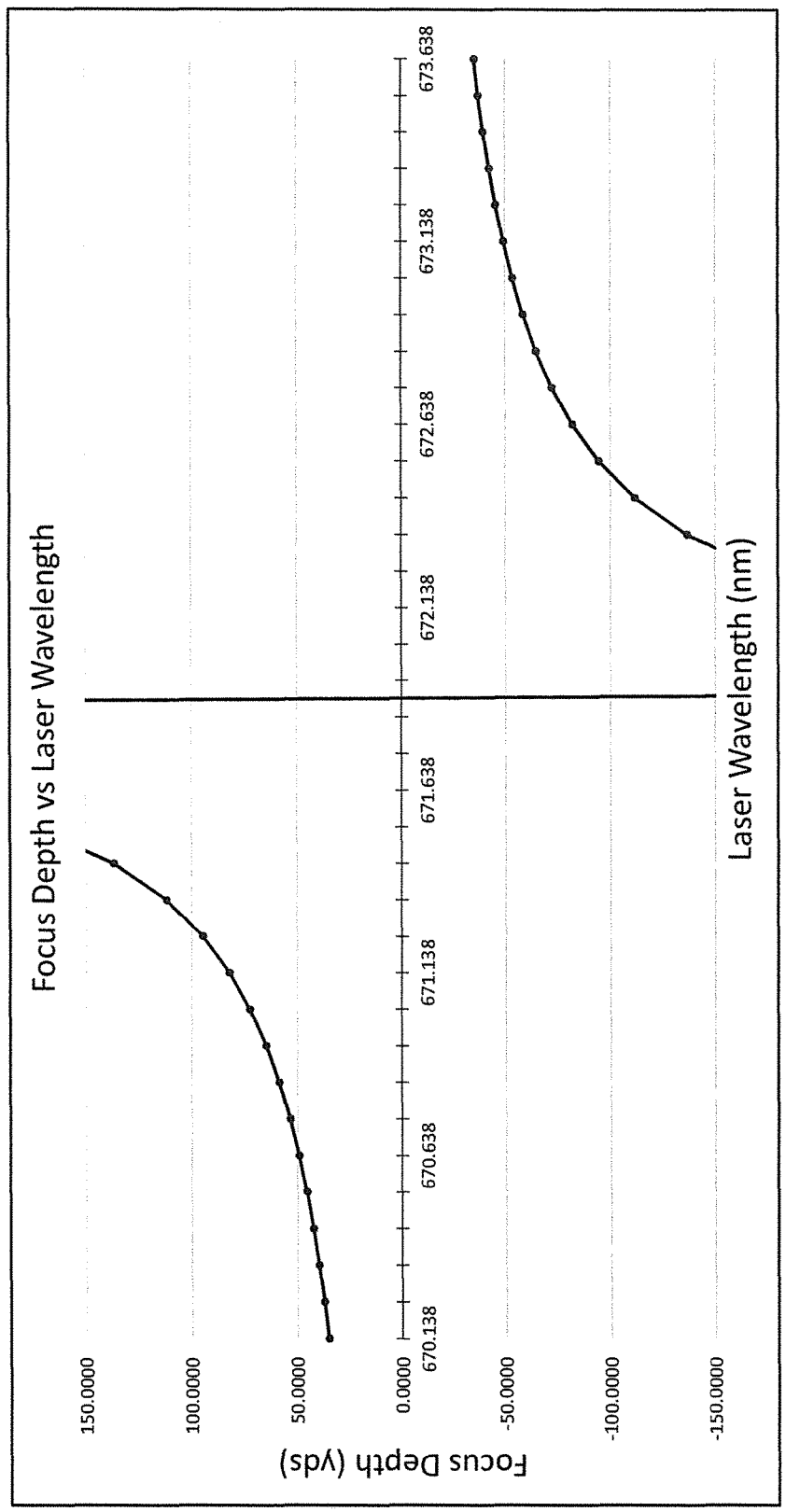
FIG. 12 is a graph showing image plane depth versus wavelength of a light source for an example of the present invention.
Figure 13:
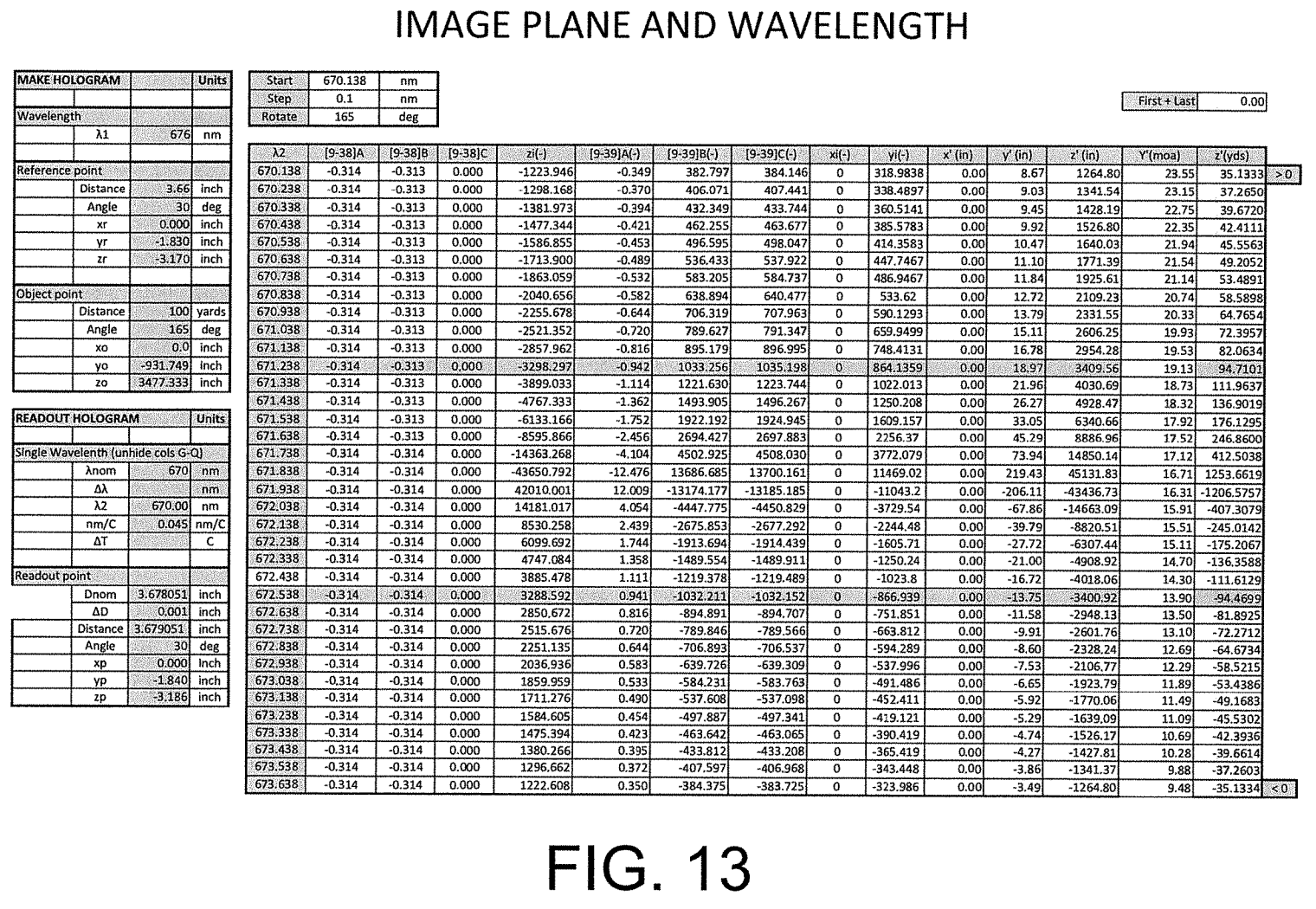

Certain embodiments of the present invention also address issues with the image plane depth of a holographic sight. The image plane depth of the holographic sight is the apparent distance at which the reticle appears. It is generally preferred that the reticle appear at a substantial distance from the user, such as a distance of at least 35 yards. If the image plane depth is very shallow, large parallax errors will occur as the user moves their eye side to side and up and down. A sight that uses collimated light may have an image plane depth that is generally constant despite changes in the wavelength of the reconstruction beam. However, with a diverging reconstruction beam, shifts in wavelength will cause the image plane depth to change. A holographic optical element has some lens-like effects. With a typical lens, as the lens position is adjusted, the image plane depth will change and an object viewed through the lens will appear to go in and out of focus as the image plane depth moves. A holographic optical element has some similar effects with respect to image plane depth. FIG. 12 provides a graph of image plane depth versus laser wavelength for one particular embodiment of the present invention. FIG. 13 provides calculations for this particular configuration. In FIG. 12, the wavelength of the reconstruction beam increases from left to right, so longer wavelengths are at the right and shorter wavelengths are at the left. At the right end of the graph, the reticle image is considered to be "real" and have a negative image plane depth. A negative image plane depth and a positive image plane depth for the holographic optical appear the same to a user. Put another way, a negative 50 yard image plane depth will look the same as a positive 50 yard image plane depth. The difference is the shape of the wavefront reaching the user.

Figure 14:
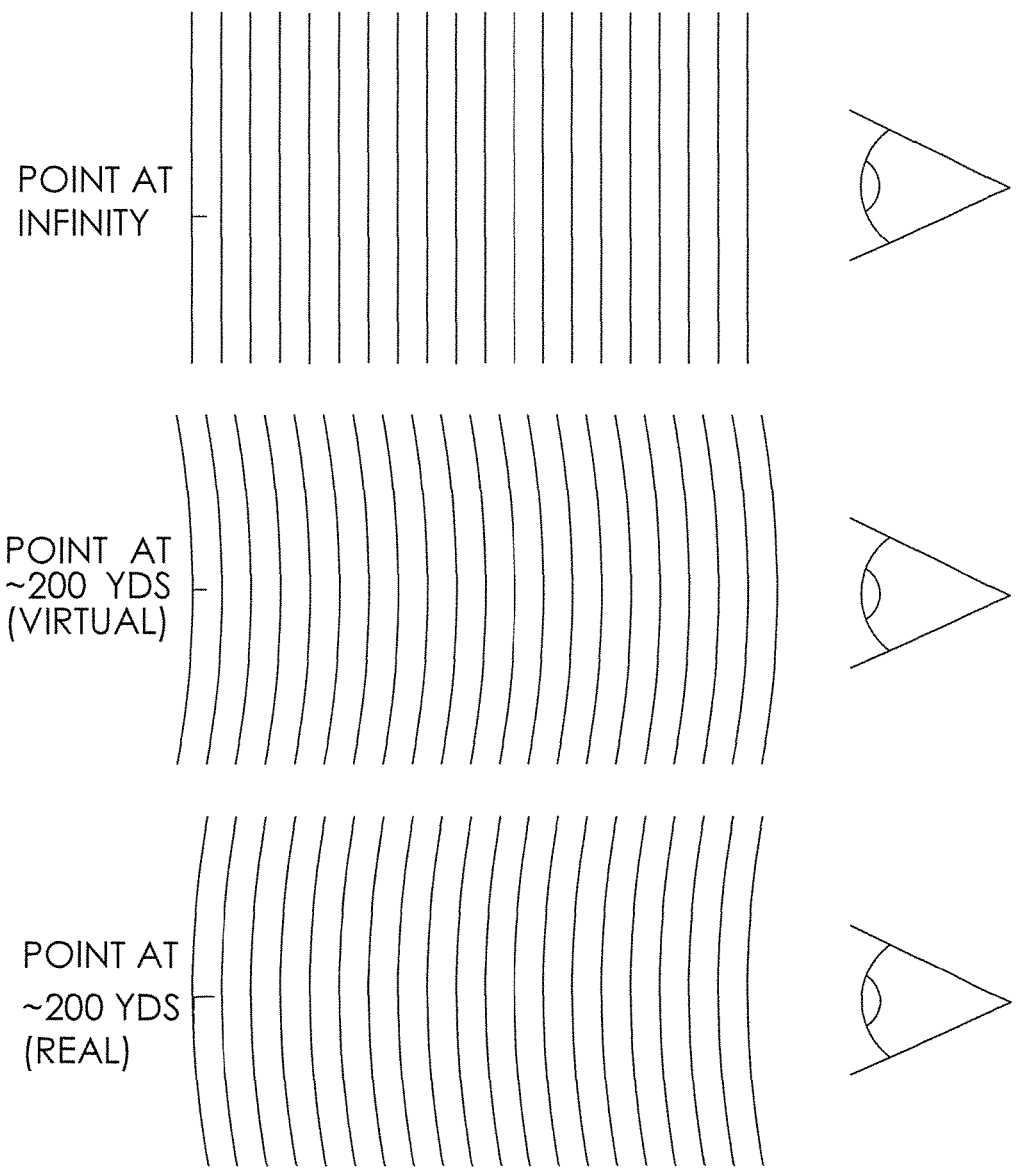
FIG. 14 is a schematic illustration of wavefronts of an image beam produced by an HOE.

FIG. 14 is a schematic showing wavefronts for various image plane depths. At the top of FIG. 14, a flat wavefront is shown approaching the eye of the user. The flat wavefront corresponds to an image plane depth at infinity. Just below this, another wavefront is shown approaching the eye, but this wavefront is convex towards the user's eye. This corresponds to a virtual image at some distance, such as 200 yards. However, it is noted that the wavefront shape is exaggerated in the Figure. The actual concavity or convexity of a wavefront is very slight. The wavefront at the bottom of FIG. 14 is concave toward the user's eye, and corresponds to a real image at some distance, such as 200 yards. Again, the wavefront shape is exaggerated.

Referring again to FIG. 12, at the right end of the graph, the image plane depth is negative, the image is "real" and the wavefront is concave toward the user. As the wavelength is reduced, the image plane depth increases, represented by moving toward the center of the graph. This corresponds to the wavefront flattening out (radius increasing). At the center of the graph, a vertical line indicates where the wavefront becomes flat and the image plane depth approaches infinity. As the wavelength is further shortened, the image becomes virtual and the image plane depth is reduced.

In accordance with an aspect of the present invention, it is preferred that the image plane depth, positive or negative, be at least far enough to limit parallax errors. In some versions, the image plane depth is at least 25 yards and in some versions the image plane depth is at least 35 yards; other depths may also be used. In one example, the wavelength of the light source, the distance from the light source to the HOE, and the operating temperature range are known. The wavelength of the light source at the extremes of the operating range may then be determined. The minimum image plane depth (for example 35 yards) is set and the sight is configured such that at the maximum temperature, and therefore at the longest wavelength, the image plane depth is real (i.e. negative) and at the selected minimum distance. Then, as the temperature is reduced, and the wavelength shortens, the image plane depth will get longer and then shorter again. When properly designed, the image plane depth will be greater than the desired minimum (positive or negative) throughout the defined operating temperature range. In one example, the wavelength of the light source is approximately 672.3 nm at 170 degrees Fahrenheit. In this example, if the image plane depth is set at 35 yards at this temperature, the image plane depth remains above 35 yards all the way down to negative 25 degrees Fahrenheit. In a further example, the minimum image plane depth is a preferred distance based on the application of the product.

Certain embodiments of the present invention may utilize a wavelength stabilized light source, such as described in co-pending provisional patent applications U.S. Ser. No. 62/184,927 and 62/279,164, the entire contents of all of which are incorporated herein by reference. This may be used to stabilize the wavelength across a temperature range or, as a more limited stabilization, to reduce the wavelength change with temperature but to still allow some wavelength change.

As will be clear to those of skill in the art, the herein described embodiments of the present invention may be altered in various ways without departing from the scope or teaching of the present invention. It is the following claims, including all equivalents, which define the scope of the invention.

The invention claimed is:

1. A holographic gun sight, comprising:
a housing having a viewing end and an opposing target end, a viewing path being defined from the viewing end to the target end;
a light source operable to project a light beam along a path; and
a reflection-type holographic optical element (HOE) having a surface, the HOE disposed in the path of the light beam such that the HOE is illuminated by the light beam at an incidence angle defined with respect to a line perpendicular to the surface of the HOE, the HOE reconstructing an object beam with an image of a reticle, the object beam having an object beam angle measured with respect to the line perpendicular to the surface of the HOE, a positive incidence angle and a positive object beam angle defined as being on opposite sides of the perpendicular line;
wherein the absolute difference between the incidence angle of the light beam and the object beam angle is greater than zero and less than or equal to 30 degrees.

2. A sight according to claim 1, wherein the absolute difference between the incidence angle of the light beam and the object beam angle is greater than five degrees.

3. A sight according to claim 1, wherein the absolute difference between the incidence angle of the light beam and the object beam angle is greater than 10 degrees and less than or equal to 20 degrees.

4. A sight according to claim 1, further comprising:
a non-diffraction element (NDE) reflecting the image of the reticle, the non-diffraction element being disposed in the viewing path such that a user views a target along the viewing path through the non-diffraction element from the viewing end; and
the HOE is not disposed in the viewing path.

5. A sight according to claim 4, wherein the non-diffraction element (NDE) is selected from the group consisting of a partial mirror, a glass element and an optical element with a dichroic film coating.

6. A sight according to claim 1, wherein the light source is a laser diode or a vertical-cavity surface-emitting laser diode (VCSEL).

7. A sight according to claim 1, further comprising:
a grating disposed in the path of the light beam from the light source, the grating reconstructing a beam and illuminating the HOE with the reconstructed beam, the light path defined as extending along the path of the light beam and the path of the reconstructed beam; or
a mirror disposed in the path of the light beam from the light source, the mirror reflecting the light beam onto the holographic optical element (HOE) and illuminating the holographic optical element (HOE).

8. A sight according to claim 1, wherein the light beam illuminating the holographic optical element is a non-collimated light beam.

9. A sight according to claim 1, wherein the light source directly illuminates the HOE without any intermediate optical element.

10. A sight according to claim 1, further comprising a base configured to attach to a weapon, the base having a lower surface and an upper surface, the lower surface configured to engage the weapon or the optical device.

11. A sight according to claim 1, further comprising:
an element holder supporting a non-diffraction element (NDE) disposed at an angle with respect to the viewing path, the element holder being pivotal with respect a transverse axis;
wherein the adjustment mechanism comprises an elevation adjustment mechanism operable to pivot the element holder with respect to the transverse axis.

12. A sight according to claim 11, wherein the elevation adjustment mechanism comprises:
an elevation screw and an elevation nut being attached to the elevation screw, the elevation nut having an upper surface and a lower surface, the upper surface having an angle, the upper surface of the elevation nut being in contact with the element holder such that transverse movement of the elevation nut pivotally moves the element holder; and
a resilient member biasing the element holder into contact with the elevation nut.

13. A sight according to claim 1, wherein:
the light source is a laser diode or a vertical-cavity surface-emitting laser diode (VCSEL); and
the non-diffraction element (NDE) is selected from the group consisting of a partial mirror, a glass element and an optical element with a dichroic film coating.

14. A sight according to claim 1, wherein:
the sight has an operating temperature range with a minimum and a maximum temperature and the light beam from the light source has a wavelength that decreases as the temperature of the light source decreases; and
the HOE is configured such that an image plane depth of the sight is a predetermined real image plane depth at a wavelength corresponding to the maximum temperature, a real image plane depth defined as an image plane depth perceived by a user viewing the image of the reticle through the viewing end of the gun sight and the wavefront of the image beam is concave toward the viewing end of the sight.

15. A method of setting an image plane depth of a holographic gun sight having a viewing end and a target end, the method comprising:
providing a holographic gun sight in accordance with claim 1, wherein the light beam produced by the light source has a wavelength that decreases as the temperature of the light source decreases;
defining an operating temperature range having a maximum temperature;
determining a wavelength of the light beam projected by the light source at the maximum temperature;
selecting a minimum image plane depth for the gun sight;
configuring the gun sight such that the image plane depth is real and equal to the minimum image plane depth at the wavelength corresponding to the maximum temperature, a real image plane depth defined as an image plane depth perceived by a user viewing the image of the reticle through the viewing end of the gun sight and the wavefront of the image beam is concave toward the viewing end of the gun sight.

16. A method according to claim 15, wherein the step of configuring the gun sight comprises creating the HOE such that the image plane depth is real and equal to the minimum image plane depth at the wavelength corresponding to the maximum temperature.

17. A method according to claim 15, wherein the operating temperature range has a defined minimum temperature, wherein the sight is configured such that the image plane depth is virtual and equal to or greater than the minimum image plane depth at a wavelength corresponding to the minimum temperature.

18. An adjustable holographic sight, comprising:
a housing having a viewing end and an opposing front end, a viewing path being defined from the viewing end to the front end;
a light source operable to project a light beam along a path;
a reflection-type holographic optical element (HOE) having a surface, the HOE disposed in the path of the light beam such that the HOE is illuminated by the light beam at an incidence angle defined with respect to a line perpendicular to the surface of the HOE, the HOE reconstructing an object beam with an image of a reticle, the object beam having an object beam angle measured with respect to the line perpendicular to the surface of the HOE, a positive incidence angle and a positive object beam angle defined as being on opposite sides of the perpendicular line;
wherein the absolute difference between the incidence angle of the light beam and the object beam angle is greater than zero and less than or equal to 30 degrees;
a non-diffraction element (NDE) reflecting the image of the reticle, the non-diffraction element being disposed in the viewing path such that a user views a target along the viewing path through the non-diffraction element from the viewing end; and
an adjustment mechanism operable to move the non-diffraction element relative to at least one axis, thereby providing a windage and/or elevation adjustment.

19. A sight according to claim 18, wherein the absolute difference between the incidence angle of the light beam and the object beam angle is greater than five degrees.

20. A sight according to claim 18, wherein the absolute difference between the incidence angle of the light beam and the object beam angle is greater than 10 degrees and less than or equal to 20 degrees.

21. A sight according to claim 20, wherein the sight is a weapon sight or a sight for an optical instrument.

22. A sight according to claim 21, further comprising:
a base having a lower surface and an upper surface, the lower surface of the base configured to engage the weapon or the optical device;
a carrier having a lower surface and an upper surface, the lower surface of the carrier being disposed near the upper surface of the base, the holographic optical element (HOE) and the light source being disposed on the upper surface of the carrier;
a vertical pivot bolt connecting the carrier to the base such that the carrier is pivotally movable in a generally horizontal plane about a vertical axis defined by the pivot bolt;
wherein the adjustment mechanism comprises a windage adjustment mechanism disposed in the carrier, the windage adjustment mechanism having a windage screw operable to pivotally move the carrier about the vertical axis.

\* \* \* \* \*